United States Patent [19]
Lewis

[11] 3,734,574
[45] May 22, 1973

[54] LOAD SENSING CONTROL DEVICE FOR A VEHICLE HYDRAULIC BRAKING SYSTEM

[75] Inventor: Richard L. Lewis, South Bend, Ind.

[73] Assignee: The Bendix Corporation, South Bend, Ind.

[22] Filed: Mar. 2, 1971

[21] Appl. No.: 120,144

[52] U.S. Cl. .............................303/22 R, 303/6 C
[51] Int. Cl. ..............................................B60t 8/22
[58] Field of Search............................188/195, 349; 303/6 C, 22 R, 22 A

[56] References Cited

UNITED STATES PATENTS

| | | | |
|---|---|---|---|
| 3,159,433 | 12/1964 | Chevreux | 303/22 A |
| 3,414,334 | 12/1968 | Payne | 303/6 C |
| 3,404,922 | 10/1968 | Valentine | 303/22 R X |
| 3,512,845 | 5/1970 | Farmery et al. | 303/22 A |
| 3,109,681 | 11/1963 | Wilson | 303/22 R |

FOREIGN PATENTS OR APPLICATIONS 903,526  8/1962  Great Britain ........................303/6 C

*Primary Examiner*—Duane A. Reger
*Attorney*—Ken C. Decker and Plante, Hartz, Smith and Thompson

[57] ABSTRACT

A control device is provided for a vehicle hydraulic braking system which includes disc brakes on the front wheels of the vehicle and drum brakes on the rear wheels of the vehicle. The control device is interposed in the brake line between the master cylinder and the front wheel disc brakes and delays fluid communication through the brake line until the fluid pressure in the brake line attains a predetermined level. After the predetermined fluid pressure level is attained, the control device permits fluid communication between the master cylinder and the disc brakes. Means responsive to the load carried by the vehicle are operatively connected with the control device to vary the predetermined fluid pressure level at which fluid communication between the master cylinder and the disc brakes is initiated.

5 Claims, 4 Drawing Figures

PATENTED MAY 22 1973

INVENTOR
RICHARD L. LEWIS

BY *Ken C. Decker*
ATTORNEY

INVENTOR
RICHARD L. LEWIS
BY Ken C. Decker
ATTORNEY 3,734,574

LOAD SENSING CONTROL DEVICE FOR A VEHICLE HYDRAULIC BRAKING SYSTEM

BACKGROUND OF THE INVENTION

Many modern vehicles are provided with disc brakes on the front wheels and drum brakes on the rear wheels. Since disc brakes generate a braking torque at much lower pressure levels than do drum brakes, it has become customary to provide a control device, known as a hold-off valve, in the front brake lines of the vehicle which acts to delay fluid communication to the front wheel brakes until a predetermined high pressure level is attained in the drum brakes, to prevent the disc brakes from locking prematurely. As is also known to those skilled in the art, the pressure level at which brakes lock is largely governed by the weight carried by the axle upon which they are mounted.

It is also desirable to vary the amount of fluid pressure delivered to the front wheel brakes of a vehicle according to the load carried by the front axle to approximate the ideal pressure relationship between the front and rear brakes as the load of the vehicle is increased. While the differences in the braking characteristics due to the load carried by the front wheels of a vehicle are relatively minor in passenger cars, braking characteristics can change considerably as the load of some commercial vehicles is increased. Therefore, it is desirable to provide a hold-off valve that is responsive to the vehicle load in certain commercial vehicles.

SUMMARY OF THE INVENTION

Therefore, an important object of my invention is to provide a hold-off valve which delays fluid communication to the front disc brakes of a vehicle until a predetermined pressure level is achieved in the master cylinder, and to provide a sensing device that changes the predetermined pressure level as the load carried by the vehicle varies.

Another important object of my invention is to provide a hold-off valve in the front brake line of a vehicle that reduces the pressure level at which communication is initiated between the master cylinder and front disc brakes as the load carried by the vehicle increases.

Still another important object of my invention is to provide a vehicle braking system in which the ideal pressure distribution between the front and rear wheel brakes is approximated over a reasonably wide range of varying vehicle loads.

DETAILED DESCRIPTION

Figure 1:
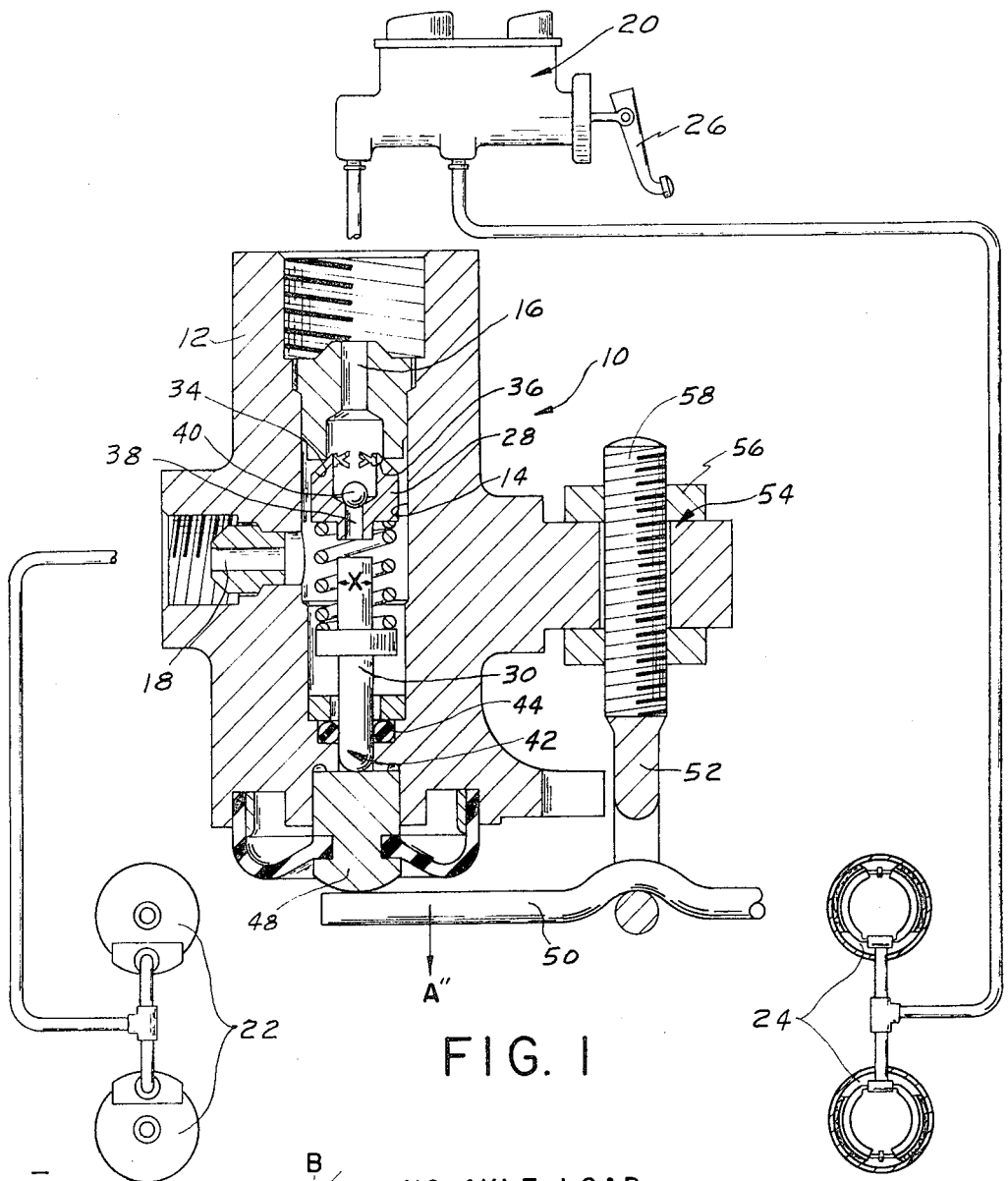
FIG. 1 is a schematic illustration of a vehicle hydraulic braking system with a control device made pursuant to the teachings of my present invention illustrated in cross section.

Referring now to FIG. 1 of the drawings, a control device or hold-off valve generally indicated by the numeral 10 includes a housing 12 defining a bore 14 therewithin having an inlet port 16 and an outlet port 18. The inlet port 16 is communicated to one side of a standard automotive split system master cylinder generally indicated by the numeral 20. The outlet port 18 is communicated to disc brakes 22 which are mounted on the front wheels of the vehicle. The other side of the split system master cylinder 20 is communicated directly to drum brakes 24 which are mounted on the rear wheels of the vehicle. Pressure is developed in the master cylinder 20 in the normal manner by operation of a pedal 26, which is mounted in the operator's compartment of the vehicle.

A valve member 28 and plunger 30 are each slidably mounted within the bore 14. A spring 32 is preloaded between the plunger 30 and the valve member 28, and yieldably urges the upper valve seating surface 34 of the valve member 28 into engagement with a valve seating area 36 provided on the housing 12, circumscribing the inlet 16. A passage 38 extends through the valve member 28. A check valve generally indicated by the numeral 40 prevents fluid communication through the passage 38 from the inlet 16 to the outlet 18, but permits fluid communication through the passage 38 in the reverse direction.

One end 42 of the plunger 30 extends from the lower portion of the bore 14. A conventional seal 44 prevents fluid leakage out of the bore 14 around the end 42 of the plunger 30. The housing 12 is provided with a counterbore 46 which slidably supports a member 48 therein, which projects from the housing 12. The spring 32 maintains the end 42 of the plunger 30 in engagement with one end of the member 48. One end of a torsion bar 50 engages the other end of the member 48, and the other end of the torsion bar 50 (not shown) is secured to the front axle of the vehicle. The torsion bar 50 pivots about an eyelet 52 which is secured to the housing 12 adjustable means generally indicated by the numeral 54. The adjustable means 54 includes a nut 56 which threadedly engages threads 58 on the eyelet 52. Therefore, the point about which the torsion bar 50 pivots may be adjusted by turning the nut 56, thereby also adjusting the force which the torsion bar 50 exerts on the member 48.

MODE OF OPERATION OF THE PREFERRED EMBODIMENT

The control device 10 is illustrated in FIG. 1 with the various components thereof disposed in the positions which they assume when the vehicle is unloaded and when the brakes of the vehicle are released. When a brake application is effected, the fluid pressure developed in the master cylinder 20 is communicated to the inlet 16, where it acts upon the valve member 28. When the fluid pressure level at the inlet 16 is sufficient to overcome the force of the spring 32, the valve member 28 is urged away from the valve seating area 36, and fluid is communicated into the bore 14 and out of the outlet port 18 to the disc brakes 22. When the pressure level in the bore 14 becomes equal to the pressure level at the inlet 16, the spring 32 returns the valve member 28 to a position in which the surface 34 sealingly engages the valve seating area 36. If the pressure at the inlet 16 is increased by another increment, the valve member 28 reopens to permit the pressure at the inlet to be communicated to the outlet 18. Therefore, the fluid pressure level at the outlet port 18 is always less than the fluid pressure level at the inlet 16 by an amount determined by the force exerted by the spring 32. This action of the valve 10 is represented by line A-B on FIG. 2, which approximates the ideal pressure relationship between the front and rear brakes, as illustrated by the dashed lines on FIG. 2.

When the brakes of the vehicle are released, the fluid pressure level at the inlet 16 is reduced. Since the fluid pressure level at the outlet 18 is higher than the fluid pressure level at the inlet 16, fluid flows through the passage 38 around the check valve 40 until the pressure level in the inlet port 16 and the outlet port 18 are equal. As graphically represented in FIG. 2, the pressure level at the inlet and outlet follows the path B-D-C. If, however, the pressure at the inlet 16 is increased as, for example, at Point E on FIG. 2, fluid pressure at the inlet increases along line E-F on FIG. 2 before any pressure increase is felt at the outlet 18, as the force exerted by the spring 32 must first be overcome. After the force exerted by the spring 32 is overcome, pressure increases at the outlet along the line F-B in FIG. 2. Therefore, the pressure level at the inlet and outlet follow a hysteresis loop when the brakes are released and then reapplied, as represented by the path B-D-E-F-B on FIG. 2.

Figure 2:
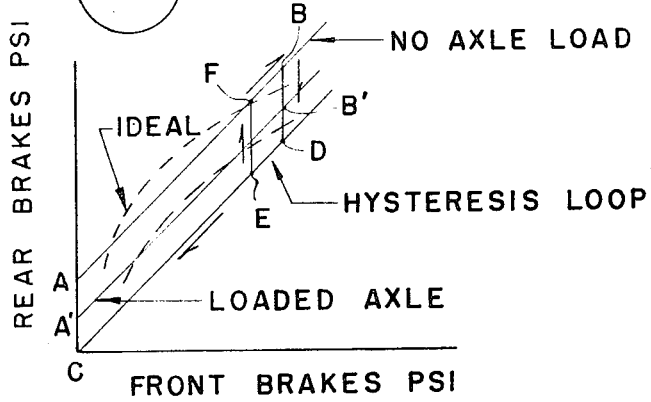
FIG. 2 is a graphical representation of the relationship between the front and rear braking pressure when the device of FIG. 1 is used in a braking system.

When the load carried by the front axle of the vehicle is increased, the end of the torsion bar 50 engaging the sliding member 48 moves away from the latter in the direction indicated by the arrow A in FIG. 1. Since the spring 32 urges the plunger 30 into engagement with the member 48 and also urges the latter into engagement with the end of the torsion bar 50, the force exerted by the spring 32 on the valve member 28 is reduced when the end of torsion bar 50 moves in the direction of the arrow A due to an increased vehicle load. Therefore, the fluid pressure level at inlet 16 required to open the valve member 28 is reduced. The valve otherwise operates in a manner identical with its operation when the vehicle is lightly loaded. Operation of the valve under full load is represented graphically by the line A' B' in FIG. 2, which approximates the ideal relationship between front and rear braking pressures for a fully loaded vehicle, as is illustrated in FIG. 2.

As will be noticed by those skilled in the art, fluid pressure in the bore 14 acting across diameter X urges the plunger 30 downwardly viewing FIG. 1, thereby relieving a portion of the force exerted by the spring 32. For this reason, the lines A-B, A'B' and C-D are shown to be slightly convergent in FIG. 2, since the hold-off pressure at which the valve member 28 moves away from the seating area 36 is reduced as the pressure level in the bore 14 increases. If this characteristic is not desired, it may be avoided by use of the valve illustrated in FIG. 3 of the drawing.

DETAILED DESCRIPTION OF THE ALTERNATE EMBODIMENT

Figure 3:
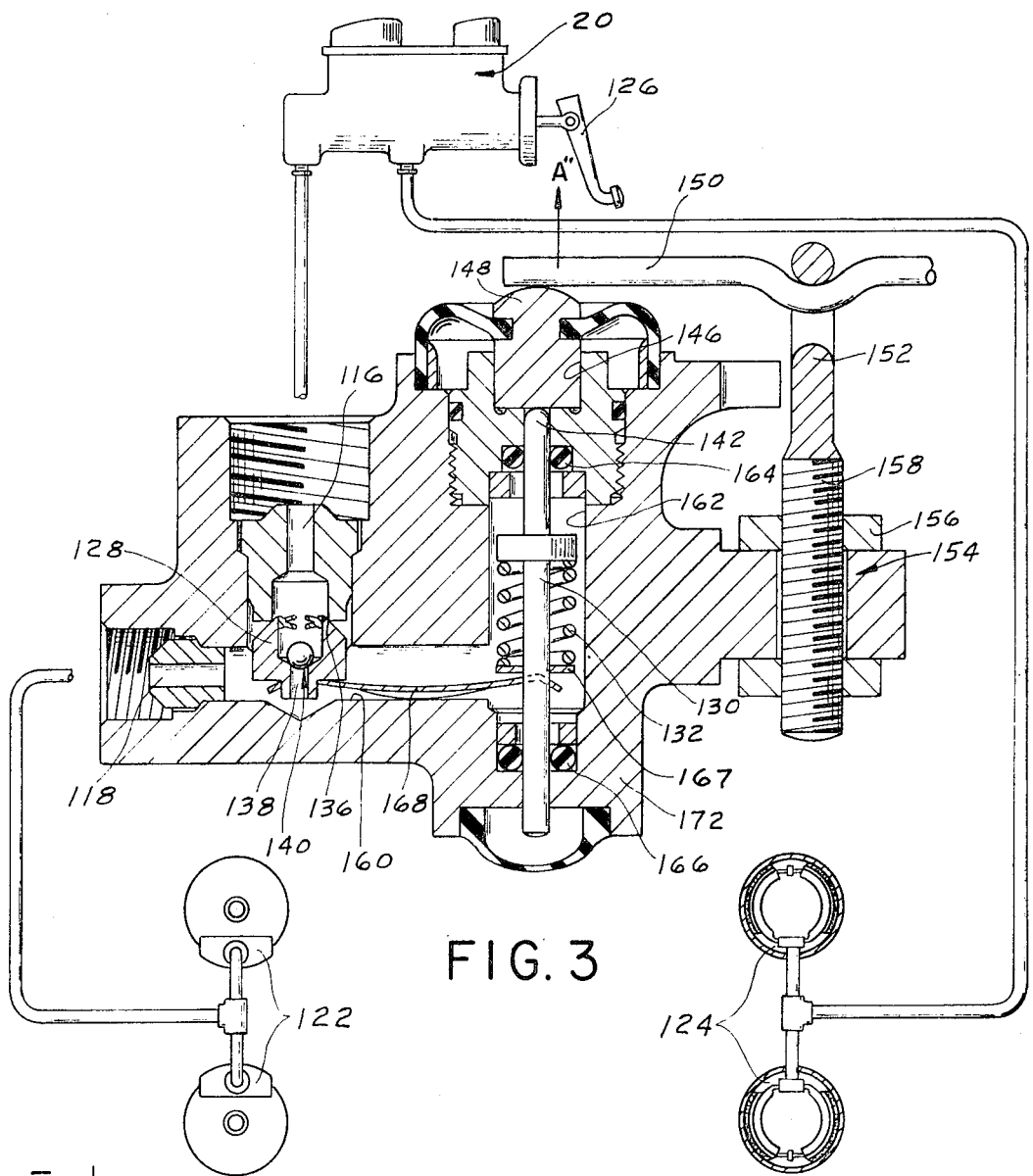
FIG. 3 is a view similar to FIG. 1, but illustrating a different embodiment of my invention.

Referring now to the embodiment of FIG. 3, elements substantially the same as those illustrated in the preferred embodiment retain the same reference character, but preceded by the numeral 1. In FIG. 3, the housing 112 is provided with a horizontal bore 160 and a vertical bore 162. The plunger 130 reciprocates in the vertical bore 162 and extends all of the way through the latter, so that it presents no unbalanced area upon which fluid pressure in the bore 162 may act. Appropriate seals 164 and 166 seal opposite ends of the plunger 130 to prevent fluid from escaping from the bore 162. The end 142 of the plunger 130 engages the sliding member 148, which in turn is engaged by the torsion bar 150. A washer 166 is slidably mounted on the plunger 130, and the spring 132 is disposed between a shoulder on the plunger 130 and the washer 166. A walking member 168 pivots on the wall of the bore 160 and transmits the motion of the washer 166 to the valve member 128 which reciprocates radially with respect to the bore 160. Therefore, the spring 132, acting through the washer 166 and the walking beam 168, yieldably urges the valve member 128 into engagement with the valve seating area 136 in a manner similar to that in the preferred embodiment.

MODE OF OPERATION

Figure 4:
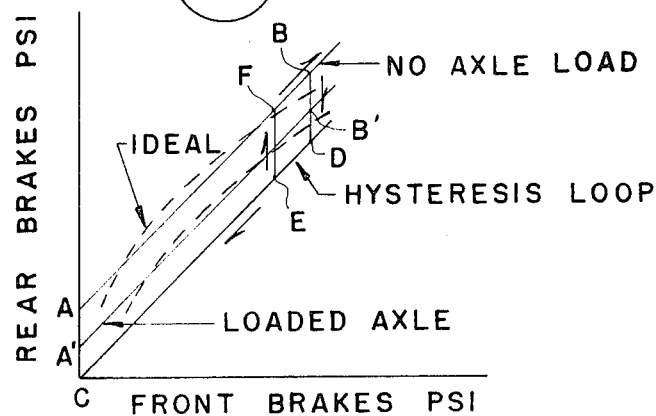
FIG. 4 is a graphical representation similar to FIG. 2, but illustrating the operation of the valve shown in FIG. 3.

Since the force of the spring 132 is transmitted to the valve member 128, the alternate embodiment operates in exactly the same manner as does the preferred embodiment when the brakes are applied and released. Similarly, when the load carried by the vehicle is increased, the torsion bar 150 moves in the direction of the arrow A, thereby reducing the preload on the spring 132 so that the force required at the inlet 116 to force the valve member 128 away from the valve seating area 136 is reduced in a manner similar to that of the preferred embodiment. However, since the fluid pressure level in the bores 160 and 162 does not act upon plunger 130, the preload of the spring 132 is not affected by changes in the pressure level in the bores 160 and 162. Therefore, the lines A-B, A'B' and C-D in FIG. 4 are parallel to each other. Other than this feature, operation of the embodiment of FIG. 3 is identical to the operation of the embodiment of FIG. 1.

I claim:

1. A control device for use in a vehicle braking system comprising:
   a housing having an inlet, an outlet, and a bore communicating the inlet with the outlet;
   valve means within said housing delaying fluid communication between said inlet and outlet until the fluid pressure level at said inlet reaches a predetermined level whereupon said valve means opens to meter fluid communication between the inlet and the outlet to establish a proportionally lower fluid pressure level at said disc brakes than that existing on said drum brakes; and
   means responsive to the load carried by the vehicle upon which the control device is mounted to change said predetermined pressure level at which the valve means opens and the ratio between the fluid pressure levels at the front and rear brakes as the load carried by the vehicle is increased;
   said predetermined fluid pressure level at which said valve means opens and the ratio between the front and rear brake fluid pressure levels being decreased as the load carried by the vehicle is increased; and
   preloaded resilient means yieldably urging said valve means into a position preventing fluid communication between the inlet and outlet;
   said load responsive means being operatively connected to said resilient means to decrease the preload of said resilient means as the load carried by the vehicle is increased.

2. The invention of claim 1:
   said load responsive means including a plunger slidably mounted in said bore and linkage means operatively connecting the plunger with the vehicle for sensing the load carried by the latter;

said resilient means being operatively connected to said plunger and to said valve means, said plunger moving to reduce the preload on said resilient means when the load carried by the vehicle is increased.

3. The invention of claim 1:

said load responsive means including a plunger slidably mounted in said bore and linkage means operatively connecting the plunger with the vehicle;

said resilient means being disposed between said plunger and said valve means;

said linkage means permitting said plunger to move away from said valve means when the load carried by the vehicle is increased to thereby reduce the preload on said resilient means whereby the force required to open the valve means is reduced.

4. The invention of claim 3:

one end of said plunger extending from said bore for engagement by said linkage means, the other end of said plunger extending into said bore and presenting a surface against which fluid pressure in the bore may act.

5. The invention of claim 2:

each end of said plunger projecting from said housing;

said linkage means engaging one end of said plunger; and means operatively connecting the plunger with the valve means;

said preloaded resilient means being disposed between the plunger and the connecting means.

* * * * *